United States Patent [19]

Kando et al.

[11] Patent Number: 4,664,482

[45] Date of Patent: May 12, 1987

[54] LIQUID CRYSTAL DISPLAY DEVICE HAVING A CHIRAL ADDITIVE AND ANGULARLY DISPLACED POLARIZERS

[75] Inventors: Yasuhiko Kando; Tamihito Nakagomi; Shinji Hasegawa, all of Mobara, Japan

[73] Assignee: Hitachi, Ltd., Tokyo, Japan

[21] Appl. No.: 838,712

[22] Filed: Mar. 12, 1986

[30] Foreign Application Priority Data

Mar. 15, 1985 [JP] Japan .................. 60-50454

[51] Int. Cl.$^4$ .............................. G02F 1/13
[52] U.S. Cl. ................... 350/346; 350/347 E; 350/337
[58] Field of Search ............ 350/337, 346, 347 E, 350/341

[56] References Cited

U.S. PATENT DOCUMENTS

| | | | |
|---|---|---|---|
| 4,398,805 | 8/1983 | Cole | 350/346 X |
| 4,579,425 | 4/1986 | Ishii et al. | 350/346 |
| 4,596,446 | 6/1986 | Waters et al. | 350/346 |

FOREIGN PATENT DOCUMENTS

| | | | |
|---|---|---|---|
| 55-127520 | 10/1980 | Japan | 350/346 |
| 58-193523 | 11/1983 | Japan | 350/346 |

OTHER PUBLICATIONS

Ishibashi, T. et al., "On the Multiplexing of the Phase Change Type Color LCD," 1980 IEEE Biennial Display Research Conference (Oct. 1980) pp. 186–188.

Primary Examiner—John K. Corbin
Assistant Examiner—Richard F. Gallivan
Attorney, Agent, or Firm—Antonelli, Terry & Wands

[57] ABSTRACT

A liquid crystal display device wherein a nematic liquid crystal having a positive dielectric anisotropy and added with a chiral material is sealed between a pair of upper and lower substrates so as to constitute a helical structure twisted within a range between 200° and 260° along a direction of thickness thereof, and polarizing axes or absorption axes of a pair of polarizing plates disposed on the upper and lower substrates are angularly displaced by a predetermined angle or predetermined angles from major axes of liquid crystal molecules adjacent to the upper and lower substrates, respectively.

6 Claims, 7 Drawing Figures

LIQUID CRYSTAL DISPLAY DEVICE HAVING A CHIRAL ADDITIVE AND ANGULARLY DISPLACED POLARIZERS

BACKGROUND OF THE INVENTION

The present invention relates to a liquid crystal display device and, more particularly, to an improvement in a field effect liquid crystal display device for time-multiplexed driving.

A conventional so-called twisted nematic liquid crystal display device has a 90° twisted helical structure of a nematic liquid crystal having positive dielectric anisotropy and sealed between two substrates having transparent electrodes arranged thereon in desired display patterns as described in G.B. Pat. No. 1,372,868. Polarizing plates are arranged on outer surfaces of the substrates such that polarizing or absorption axes thereof become perpendicular or parallel to the major axes of the liquid crystal molecules adjacent to the substrates.

In order to twist the liquid crystal molecules between the two substrates through 90°, orienting layers are formed on said electrodes and exposed surfaces of the substrates by coating polyimide resin and making numerous fine grooves by rubbing the coated surfaces which contact the liquid crystal molecules by a cloth along one direction. In this case, the major axes of the liquid crystal molecules adjacent to the surface become parallel to this one direction (i.e., a rubbing direction). Two rubbed surfaces are spaced apart so as to oppose each other while their rubbing directions are crossed at about 90°. These rubbed substrates are then sealed with a sealing agent, and a nematic liquid crystal having positive dielectric anisotropy is filled in a space formed between the substrates. Therefore, the major axes of the liquid crystal molecules are twisted through about 90° between the substrates. The resultant liquid crystal cell is sandwiched between a pair of polarizing plates with their polarizing axes substantially parallel or perpendicular to the major axes of liquid crystal molecules adjacent thereto, respectively. In a conventional reflective type liquid crystal display device which is most frequently used, a reflector is disposed on the outer surface of the lower polarizing plate. Light incident on the upper surface of the device is linearly polarized by the polarizing plate or polarizer. In a portion of a liquid crystal layer which is not applied with a voltage, the plane of polarization of the linearly polarized light is rotated though 90° along the helical structure and is transmitted through the lower polarizing plate. The light is then reflected by the reflector and returns to the upper surface of the device. However, in a portion of the liquid crystal layer which is applied with a voltage, where the helical structure is destroyed, the plane of polarization of the linearly polarized light will not be rotated. Therefore, the linearly polarized light transmitted through the upper polarizing plate is blocked by the lower polarizing plate and will not reach the reflector. In this manner, electrical signals can be converted into optical images in accordance with the presence or absence of an electrical potential applied across the liquid crystal layer.

The twisted nematic type liquid crystal display device (hereinafter referred to as "TN-LCD" for short), owing to its merits such as low driving voltage, low power consumption, small thickness, and light weight, has found extensive utility in wrist watches, desk computers, various industrial measuring instruments, and automotive instruments.

The dot matrix type TN-LCD which is capable of displaying letters and fiqures has long been arousing much interest as useful for display devices in portable computers and various data terminals. At present $64 \times 480$ and $128 \times 480$ dot matrix display devices multiplexed at a 1/64 duty factor are on the market. The demand in market, however, is shifting to LCD's with still higher contents of display and information density such as those of $200 \times 640$ picture elements and $256 \times 640$ picture elements which are equivalent in display capacity to cathode-ray picture tubes. For such LCD's to be commercially feasible, they are required to be effectively driven in a highly time-multiplexed fashion of the order of duty factor of 1/100 or 1/128.

FIG. 1 is a graph showing typical luminance-voltage characteristics of a conventional reflective type liquid crystal display device having a 90° twisted helical structure of a nematic liquid crystal and with axes of its polarizer intersecting at right angles. The graph shows the relative luminance of reflected light as a function of the applied voltage. An initial value of luminance is taken as 100%, and a final value when little or no further change in luminance occurs at sufficiently high voltage is taken as 0%. In general, a threshold voltage Vth is given at a 90% relative luminance, and a saturation voltage Vsat is given at a 10% relative luminance so as to determine the liquid crystal characteristics. A pixel is sufficiently bright when the relative luminance is more than 90%, so that the pixel is considered to be in an OFF state. However, in practice, when the relative luminance is less than 50%, the pixel is dark enough for further decrease in luminance to be almost imperceptible to the eye, and hence the pixel is considered to be in an ON state. Voltages corresponding to 90% and 50% of relative luminance are given as the threshold voltage Vth and the saturation voltage Vsat, respectively, hereinafter. In other words, the threshold voltage Vth is given as a maximum allowable voltage corresponding to the OFF state, and the saturation voltage Vsat is given as a minimum allowable voltage corresponding to the ON state. For a transmissive type liquid crystal display device, FIG. 1 would represent transmission-voltage characteristics.

The electrooptical characteristics of the liquid crystal display device change in accordance with a viewing angle. These characteristics limit a viewing angle range within which a good display quality is obtained.

A viewing angle $\phi$ will be described with reference to FIG. 2. Referring to FIG. 2, in a liquid crystal display device 1, a nematic liquid crystal 33 having positive dielectric anisotropy is sandwiched between two substrates 11, 12 having transparent electrodes arranged thereon in desired display patterns and orienting layers (not shown) which are formed on the electrodes and exposed surfaces of the substrates by coating, for example, polyimide resin and making numerous fine grooves by rubbing the coated surfaces with a cloth unidirectionally. A rubbing direction of an upper substrate 11 of a liquid crystal display device 1 is represented by reference numeral 2, a rubbing direction of a lower substrate 12 is represented by reference numeral 3, and a twist angle between major axes of liquid crystal molecules adjacent to the upper substrate and those of liquid crystal molecules adjacent to the lower substrate is represented by 4. X- and Y-axes are located on the surface of the liquid crystal display device 1. The X-axis defines a direction for bisecting the twist angle 4 of the liquid crystal molecules. A Z-axis defines a normal to the X-Y plane. An angle between a viewing direction 5 and the Z-axis is defined as the viewing angle $\phi$. In this case, by way of simplicity, the viewing direcion 5 is in the X-Z plane. The viewing angle $\phi$ in FIG. 2 is regarded to be positive. Since contrast becomes high when viewed from a direction in the X-Z plane, this direction is called the viewing direction 5.

Performance parameters for a quantification of time-multiplexed driving characteristics in the subsequent description will be briefly described below.

FIG. 1 is a graph showing typical luminance-voltage characteristics of a reflective twisted nematic type liquid crystal display device when its polarizing axes are crossed.

Commercially available conventional liquid crystal display devices have acceptable viewing angles falling within a range of 10 to 40°. At a viewing angle $\phi$ of 10°, a driving voltage giving 90% luminance, at which liquid crystal display device begins to appear to be "on" to an observer is designated by Vth1, and a driving voltage giving 50% luminance below which further decrease begins to be almost imperceptible to the eye is designated by Vsat1, and at a viewing angle $\phi$ of 40°, a driving voltage giving 90% luminance is designated by Vth2.

The sharpness of the luminance-voltage characteristic, $\gamma$, the viewing-angle dependence of luminance, $\Delta\phi$, and the time-multiplexability, m are defined as follows:

$\gamma = Vsat1/Vth1$
$\Delta\phi = Vth2/Vth1$
$m = Vth2/Vsat1$

Assuming luminance-voltage characteristic curves are ideal, the two curves at different viewing angles $\phi$ of 10° and 40° coincide, and the curves are steep enough for both a threshold voltage and a saturation voltage to have the same value.

The time-multiplexed driving characteristics of the conventional liquid crystal display device depends on $\Delta n \cdot d$ where $\Delta n$ is the refractive index anisotropy, i.e., optical anisotropy of the liquid crystal and d is the distance between the upper and lower substrates. When $\Delta n \cdot d$ is large (e.g., more than 0.8 $\mu m$), the sharpness of the luminance-voltage characteristic, $\gamma$ becomes good (small value), and the viewing-angle dependence, $\Delta\phi$ is poor (small value). However, when $\Delta n \cdot d$ is small (e.g., less than 0.8 $\mu m$), the sharpness of the luminance-voltage characteristic, $\gamma$ becomes poor (large value) and the viewing-angle dependence, $\Delta\phi$ becomes good (large value). However, the time-multiplexability, $m(=\Delta\phi/\gamma)$ becomes good (large value) when $\Delta n \cdot d$ is decreased.

Two typical examples are shown in Table 1.

TABLE 1

| Performance Parameters | $\Delta n \cdot d$ | |
|---|---|---|
| | 0.5 $\mu m$ | 1.0 $\mu m$ |
| $\gamma$ | 1.150 | 1.084 |
| $\Delta\phi$ | 0.965 | 0.877 |
| m | 0.839 | 0.808 |

Time-multiplexed driving will be briefly described with reference to a dot matrix display. As shown in FIG. 3, Y stripe electrodes (signal electrodes) 13 and X stripe electrodes (scanning electrodes) 14 are formed on the lower and upper substrates 12, 11 (not shown), respectively. Pixels (picture elements), liquid crystal portions at intersections of the X and Y electrodes 14 and 13 are chosen to be in an ON state or an OFF state so as to display characters or the like. N scanning electrodes X1, X2, ..., Xn are successively and repeatedly scanned in the order named in a time-multiplexed manner. When a given scanning electrode, e.g., X3 in FIG. 3 is selected, a selection or nonselection display signal is simultaneously applied to all pixels P31, P32, ... and P3m on the given scanning electrode through the signal electrodes 13 constituted by electrodes Y1, Y2, ... and Ym in accordance with a display signal. In other words, the ON and OFF state of the pixels at the intersections of the scanning electrodes and the signal electrodes is determined by a combination of voltage puleses applied to the scanning and signal electrodes. In this case, the number of scanning electrodes 14 corresponds to the number of time-multiplexing.

The conventional liquid crystal display device has poor time-multiplexed drive characteristics as shown in Table 1, and these characteristics would permit practical time-multiplexing of only a maximum of 32 or 64. However, demand has arisen to improve the image quality of the liquid crystal display device and increase information content to be displayed. Any conventional liquid crystal display devices cannot satisfy these needs.

SUMMARY OF THE INVENTION

It is, therefore, an object of the present invention to provide a liquid crystal display device having a cell structure entirely different from that of the conventional liquid crystal display device and a twist angle, $\alpha$, different from 90° of a conventional helical structure of nematic liquid crystal molecules, thereby providing excellent time-multiplexed drive characteristics and hence higher contrast ratio, wider acceptable range of viewing angles, and less coloring in display even if the number of time-multiplexing, that is, the number of scanning lines is more than 100.

According to one aspect of the present invention there is provided a liquid crystal display device wherein a nematic liquid crystal having a positive dielectric anisotropy is sealed between a pair of upper and lower substrates so as to constitute a helical structure twisted within a range of from 200° to 260° along a direction of thickness thereof, polarizing axes or absorption axes of a pair of polarizing plates disposed on the upper and lower substrates are angularly displaced by a predetermined angle or predetermined angles, from major axes of liquid crystal molecules adjacent to the upper and lower substrates, respectively.

DETAILED DESCRIPTION OF THE PREFERRED EMBODIMENTS

Preferred embodiments of the present invention will be described with reference to the accompanying drawings.

Figure 1:
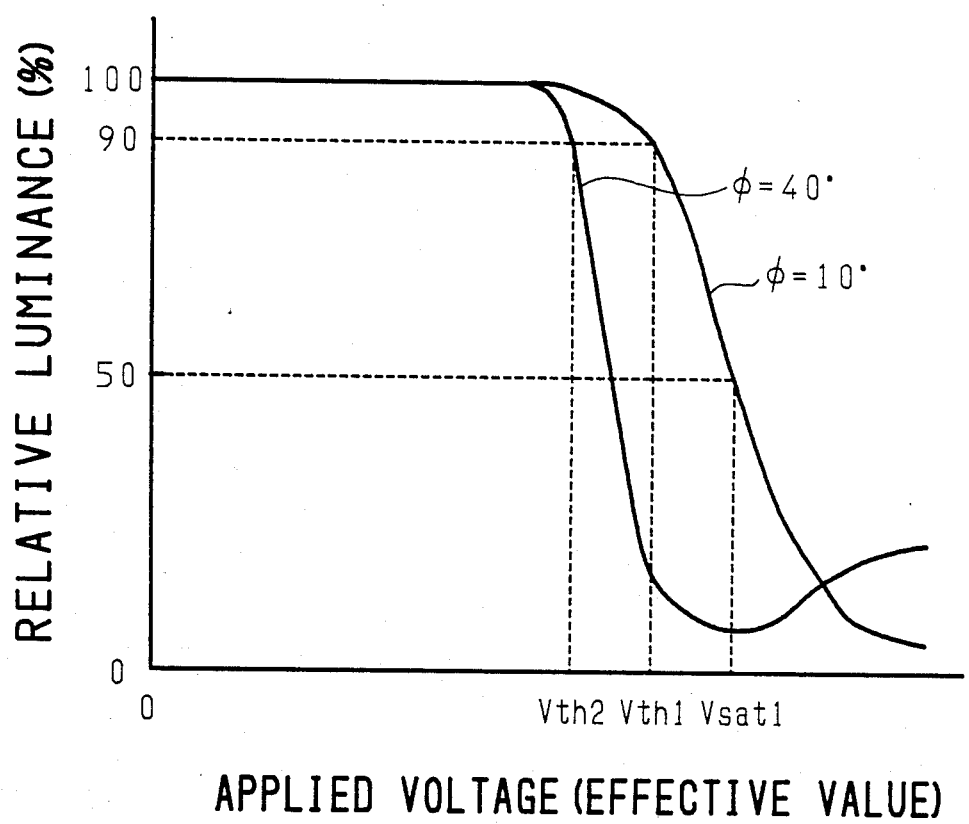
FIG. 1 is a graph showing the luminance-voltage characteristics of a conventional liquid crystal display device used in defining time-multiplexed driving characteristics.
Figure 2:
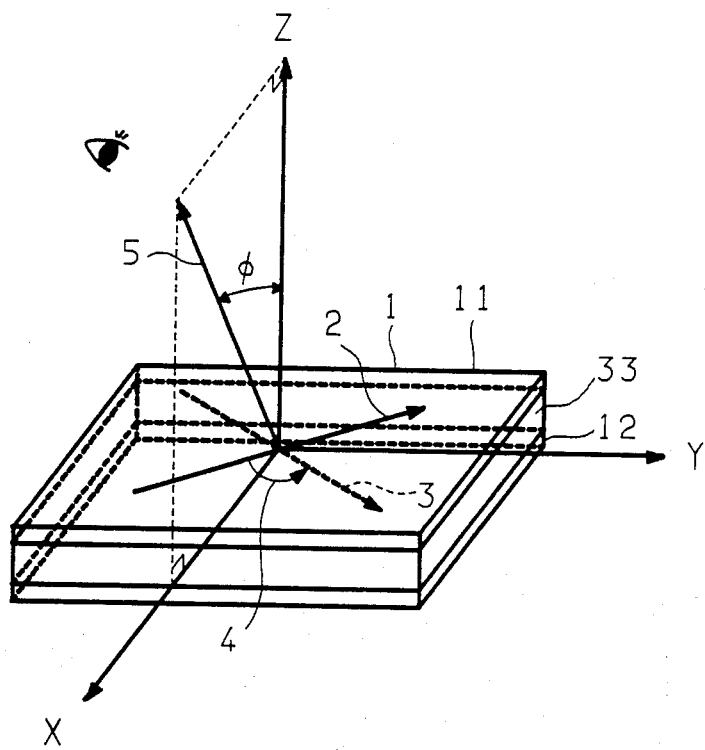
FIG. 2 is a perspective view of the liquid crystal display device for explaining the measuring direction of the time-multiplexed driving characteristics.
Figure 3:
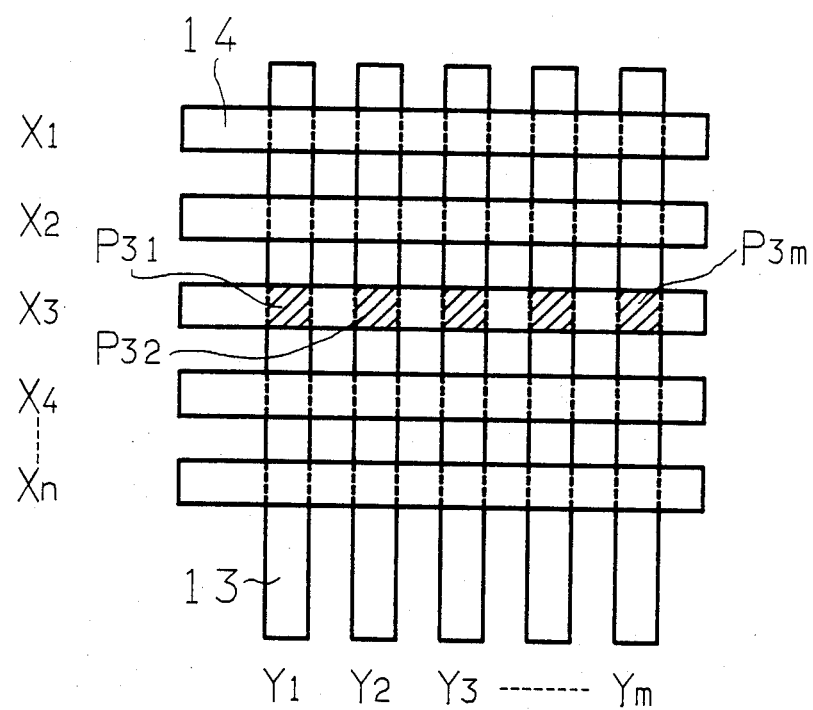
FIG. 3 is a representation for explaining time-multiplexed driving.
Figure 4:
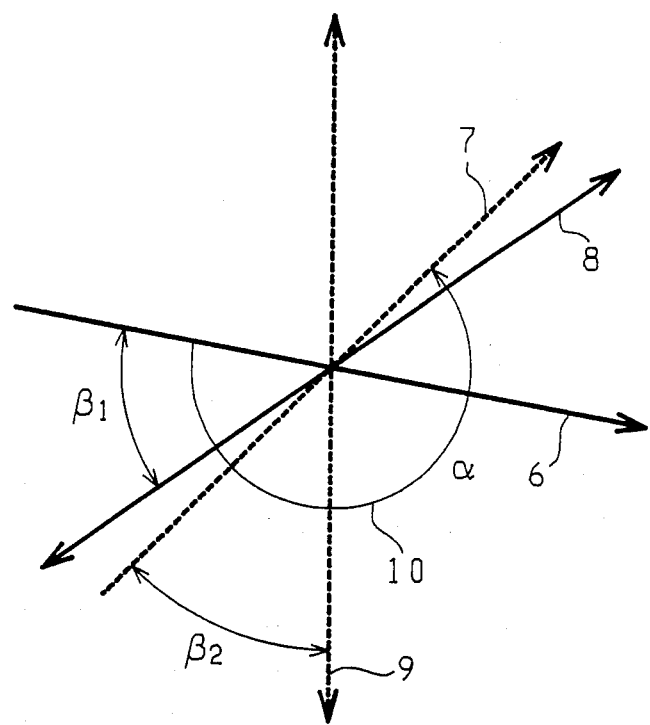
FIGS. 4, 5 and 6 are representations for explaining the relationship between the orienting direction, the twist direction of liquid crystal molecules and the axes of polarizers of a liquid crystal display device according to an embodiment of the present invention, respectively.
Figure 5:
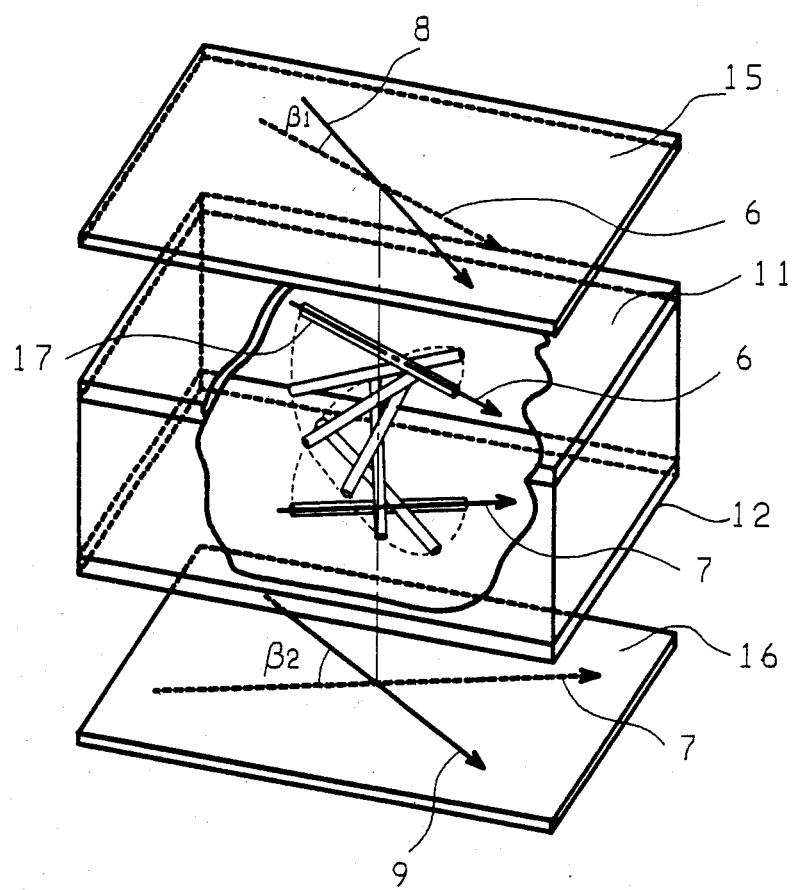

FIG. 4 shows the relationship between the direction (equivalent to, e.g., a rubbing direction) of major axes of the liquid crystal molecules adjacent to the upper or lower substrates, a twist angle thereof, and absorption axes (or polarizing axes) of the polarizers of a liquid crystal display device according to an embodiment of the present invention when the liquid crystal display device is viewed from the upper direction. FIG. 5 is a perspective view showing this relationship. The same reference numerals as in FIG. 2 denote the same parts as in FIG. 2.

The twist direction 10 (indicated by a curved arrow) and the twist angle $\alpha$ of the liquid crystal molecules 17 are determined by the rubbing direction 6 of the upper substrate 11, the rubbing direction 7 of the lower substrate 12, and the type and an amount of a chiral material added to a nematic liquid crystal. In particular, the twist direction is determined by the type and an amount of chiral material. The twist angle is determined by the rubbing directions 6 and 7 of the upper and lower substrates 11 and 12.

The liquid crystal molecules adjacent to the rubbed inner surfaces of the substrates have alignments roughly at an angle between 1° and 8° to the respective rubbed surfaces when the surfaces coated with polyimide resin are rubbed.

The stability of orientation of the liquid crystal molecules is determined by a specific pitch of the chiral material, an amount thereof, and a thickness of the liquid crystal layer.

The maximum allowable value of the twist angle $\alpha$ is limited to 260° because light scattering thends to occur when the liquid crystal display device is in an ON state at or near the threshold voltage. The minimum allowable value of the twist angle $\alpha$ is 200° because at twist angles smaller than 200° contrast ratio of luminance of an OFF state element to that of an ON state element is too low.

The angle $\beta 1$ between the absorptin axis (or polarizing axis) 8 of the upper polarizing plate 15 and the rubbing direction 6 of the upper substrate 11 and the angle $\beta 2$ between the absorption axis (or polarizaing axis) 9 of the lower polarizing plate 16 and the rubbing direction 7 of the lower substrate 12, respectively, fall, acceptably within the range between 20° and 70°, and preferably within the range between 30° and 60° when contrast, luminance, color, time-multiplexing drive characteristics, and the like are considered.

The characteristics of the liquid crystal display device according to the present invention greatly depend on $\Delta n \cdot d$, i.e., an optical path difference, d and $\Delta n$ being a thickness in $\mu m$ and an optical anisotropy of the liquid crystal layer, respectively. When the optical path difference satisfies the condition $0.8 \ \mu m \leq \Delta n \cdot d \leq 1.2 \ \mu m$, the characteristics in terms of contrast ratio, luminance, color and the like are satisfactory, and the characteristics are best when $0.9 \ \mu m \leq \Delta n \cdot d \leq 1.1 \ \mu m$.

The optical anisotropy $\Delta n$ generally depends on measuring wavelengths. The optical anisotropy is increased when the wavelength is short, while it is decreased when the wavelength becomes long. The optical anisotropy $\Delta n$ value in this specification is measured by using an He-Ne laser beam of a wavelength of 6,328 Å at a temperature of 25° C. When the optical anisotropy is measured at another wavelength, the values may be slightly different from the values in this specification.

The construction and the measured results of the liquid crystal display device according to an embodiment of the present invention will be described hereinafter.

Figure 6:
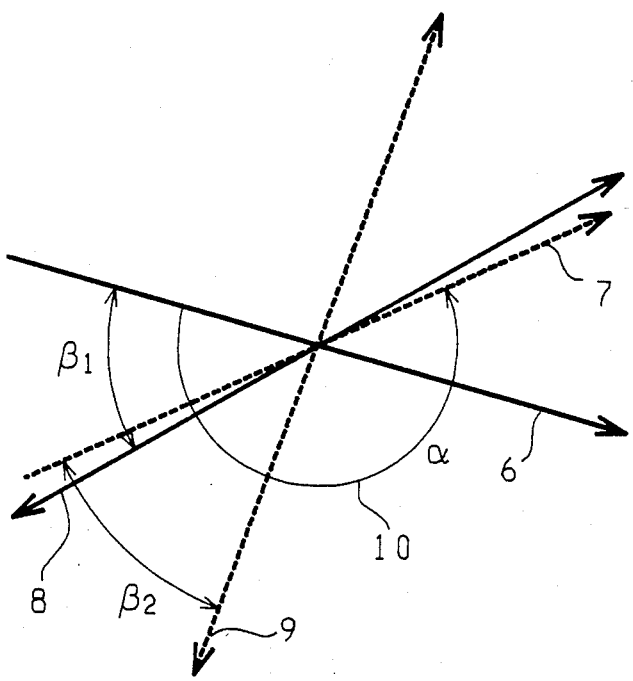

FIG. 6 shows the relationship between the rubbing direction of the substrates, the twist direction and twist angle of the helical structure of the liquid crystal molecules, and the polarizing axes (or absorption axes) of the plarizers when the liquid crystal display device is viewed from the upper direction.

A liquid crystal used in this device comprises a nematic liquid crystal. This nematic liquid crystal contains as major constituents biphenyl liquid crystal and cyclohexane ester (ECH) liquid crystal. The nematic liquid crystal further contains as an additive 0.7% by weight of a chral material S811

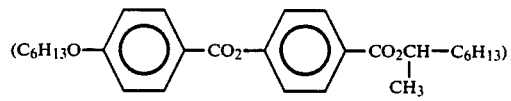

available from Merck (Fed. Rep. of Germany). The optical anisotropy $\Delta n$ of this nematic liquid crystal is 0.123.

Referring to FIG. 6, the angle between the rubbing directions 6 and 7 of the upper and lower substrates 11 and 12 is 220°, the twist direction upon addition of the chiral material S811 is represented by reference numeral 10 (counterclockwise), and the twist angle $\alpha$ is 220°. The angle $\beta 1$ between the rubbing direction 6 and the absorption axis 8 of the upper polarizer 15 and the angle $\beta 2$ between the rubbing direction 7 and the absorption axis 9 of the lower polarizer 16 are respectively 45°.

A number of liquid crystal devices with the arrangement of FIG. 6 and various values of thickness d of liquid crystal layers resulting in various values of optical path difference $\Delta n \cdot d$ have been constructed for testing displayed colors and luminance. Test results are shown in Table 2.

TABLE 2

| $\Delta n \cdot d$ ($\mu m$) | Luminance | Color |
|---|---|---|
| 0.50 | dark | yellow to reddish brown |
| 0.63 | dark | blue to purple |
| 0.76 | dark | light blue |
| 0.86 | slightly bright | green |
| 0.98 | bright | yellowish green |
| 1.15 | bright | reddish orange |
| 1.30 | slightly dark | reddish purple |
| 1.45 | dark | bluish green |

It was found that both colors and luminance of the liquid crystal display device were best and satisfactory when the optical path difference $\Delta n \cdot d$ was about 1.00 $\mu m$, and by further detailed studies it was also found that no problem occured in practice when the optical path difference $\Delta n \cdot d$ fell within the range from 0.7 $\mu m$ to 1.20 $\mu m$ with the relationship shown in FIG. 6. Table 2 shows experimental results with the twist angle α and the displacement angles β1, β2 being 220° and 45°, respectively. And results similar to those of Table 2 can be obtained with the FIG. 4 arrangement when the twist angle α falls within a range between 200° and 260° and the displacement angles β1 and β2 fall within a range between 20° and 70°, the range of Δn·d being between 0.7 and 1.20 μm without raising any practical problems.

The measured results of the time-multiplexed drive characteristics of the liquid crystal cell having the optical path difference Δn·d of 0.98 μm are shown in Table 3 according to the liquid crystal device of the present invention. The sharpness of luminance-voltage characteristic, γ, the viewing-angle dependence, Δφ and the time-multiplexability, m are greatly improved compared with those values of the conventional liquid crystal display device shown in Table 1.

TABLE 3

| | |
|---|---|
| γ | 1.020 |
| Δφ | 0.988 |
| m | 0.969 |

Figure 7:
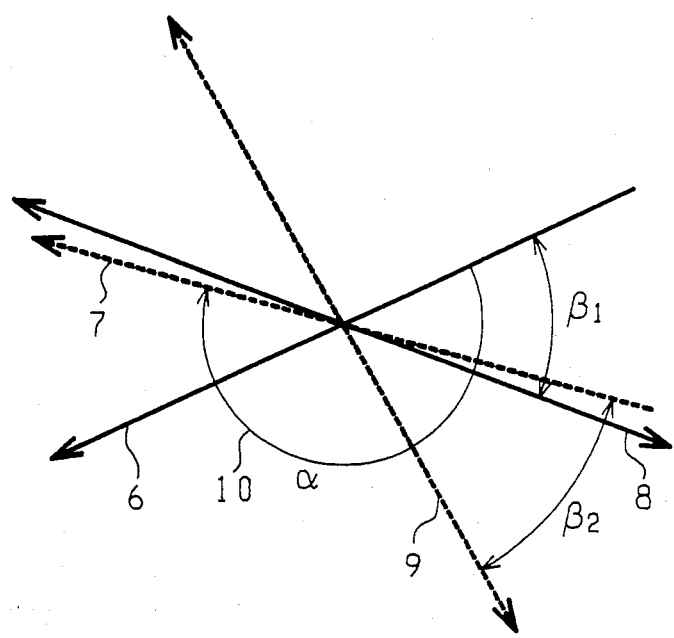
FIG. 7 is a representation for explaining the relationship between the orienting direction, the twist direction of liquid crystal molecules, and the axes of polarizers of a liquid crystal display device according to another embodiment of the present invention.

In FIG. 6, the polarizing axes of the polarizing plates can be arranged in place of the absorption axes to obtain the similar effects. In the above embodiment, a liquid crystal mixture of biphenyl and cyclohexane ester (ECH) liquid crystals is used. However, any other nematic liquid crystal having a positive dielectric anisotropy may be used to obtain the similar effects as in the above embodiment. Especially the use of a liquid crystal mixture containing phenylcyclohexane (PCH) improves electro-optical response. The twist direction of the helical structure is counterclockwise in the above embodiment. However, as shown in FIG. 7, the twist direction may be clockwise to obtain the same effects as in the above embodiment.

In the above embodiment, the polarizing axes or absorption axes of the upper and lower polarizing plates are angularly displaced from the direction of major axes of liquid crystal molecules adjacent to the substrates in the same direction as the twist of the liquid crystal molecules, but they can be angularly displaced in the direction opposite to the twist with the similar results obtained, and the displacement angle β1 can be different from the displacement angle β2.

The type of a chiral material is not particularly limited to the above chiral material if the relationships between the rubbing directions and the twist directions shown in FIGS. 4, 5, 6 and 7 can be satisfied.

What is claimed is:

1. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 200° and 260° along a direction of thickness thereof, and polarizing axes or absorption axes of a pair of polarizing plates disposed on said upper and lower substrates are angularly displaced by a predetermined angle or predetermined angels from major axes of liquid crystal molecules adjacent to said upper and lower substrates, respectively.

2. A device according to claim 1, wherein said absorption axis or said polarizing axis of each of said polarizing plates and a direction of a corresponding one of said major axes of the liquid crystal molecules adjacent to said upper and lower substrates constitute an included angle falling within a range between 20° and 70°.

3. A device according to claim 1, wherein a product Δn·d of a thickness d (μm) of a liquid crystal layer and its optical anisotropy Δn falls within a range from 0.7 μm to 1.2 μm.

4. A device according to claim 1, wherein said orienting layers are formed by rubbing surfaces coated by polyimide resin of electrodes and exposed surfaces.

5. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 200° and 260° along a direction of thickness thereof, polarizing axes or absorption axes of a pair of polarizing plates disposed on said upper and lower substrates are angularly displaced by an angle between 20° and 70° from major axes of liquid crystal molecules adjacent to said upper and lower substrates, respectively, and a product Δn·d of a thickness d (μm) and an optical anisotropy Δn of a liquid crystal layer falls within a range from 0.7 μm to 1.2 μm.

6. A device according to claim 5, wherein said orienting layers are formed by rubbing surfaces coated by polyimide resin of electrodes and exposed surfaces.

* * * * *